(12) United States Patent
Spehr et al.

(10) Patent No.: US 8,583,571 B2
(45) Date of Patent: Nov. 12, 2013

(54) FACILITY FOR RECONCILIATION OF BUSINESS RECORDS USING GENETIC ALGORITHMS

(75) Inventors: Darren Spehr, Seattle, WA (US); John Aegard, Seattle, WA (US); Matthew Berk, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 1049 days.

(21) Appl. No.: 12/512,821

(22) Filed: Jul. 30, 2009

(65) Prior Publication Data

US 2011/0029467 A1 Feb. 3, 2011

(51) Int. Cl.
*G06N 3/00* (2006.01)
(52) U.S. Cl.
USPC ............................................ 706/13
(58) Field of Classification Search
USPC ............................................ 706/13
See application file for complete search history.

(56) References Cited

U.S. PATENT DOCUMENTS

| | | | |
|---|---|---|---|
| 5,974,412 A | 10/1999 | Hazlehurst et al. | |
| 6,295,541 B1 * | 9/2001 | Bodnar et al. | 1/1 |
| 6,449,603 B1 | 9/2002 | Hunter | |
| 6,868,411 B2 | 3/2005 | Shanahan | |
| 7,124,105 B2 | 10/2006 | Hilton | |
| 7,171,617 B2 * | 1/2007 | Harrington et al. | 715/255 |
| 7,240,038 B2 | 7/2007 | Hitt | |
| 7,287,019 B2 * | 10/2007 | Kapoor et al. | 1/1 |
| 7,362,892 B2 | 4/2008 | Lewis et al. | |
| 7,499,891 B2 | 3/2009 | Hitt | |
| 7,526,461 B2 | 4/2009 | Srinivasa et al. | |
| 2006/0204107 A1 | 9/2006 | Dugan et al. | |
| 2006/0242180 A1 | 10/2006 | Graf et al. | |
| 2010/0281061 A1 * | 11/2010 | Chen | 707/794 |

OTHER PUBLICATIONS

"A Multistrategy Approach for Digital Text Categorization from Imbalanced Documents", M Dolores Del Castillo, Jose Ignacio Serrano, ACM SIGKDD Explorations Newsletter, vol. 6 Issue 1, Jun. 2004, pp. 70-79.*

* cited by examiner

*Primary Examiner* — Kakali Chaki
*Assistant Examiner* — Mai T Tran
(74) *Attorney, Agent, or Firm* — Perkins Coie LLP

(57) ABSTRACT

A facility for the reconciliation of data records pertaining to business entities. One or more fitness functions are applied to fields contained in two conflicting data records to assess the similarity of each field. The results of the fitness functions are then weighted and combined to assess the likelihood that the two data records are associated with the same business entity. When the weighted fitness functions are applied to conflicting data records, the fitness functions generate a confidence level that the compared records are associated with the same business entity. If the confidence level exceeds a certain threshold, the facility accepts that the data records refer to the same business entity and synthesizes a business record from the data records.

44 Claims, 6 Drawing Sheets

Business Record 1 (100)

Name: Restaurant Zoe
Address: 2137 2nd Ave
City: Seattle
State: WA
Zip: 98121
Phone: 206-256-2060
Hours: M-R 5pm – 10pm, F-Sa 5pm – 11pm, Su 5pm-10pm

Business Record 2 (105)

Name: Zoe Restaurant
Address: Second Ave
Neighborhood: Belltown
Phone: 256-2060
URL: www.restaurantzoe.com

Business Record 3 (110)

Name: Restaurant Zoe
Address: PO Box 2137
Zip: 98101
Average review: 4.8
Review #1: I had a great meal at Zoe's last night. The cocktails were inspired, the service excellent, and I couldn't found a better place to celebrate my birthday.
Review #2: .....

*FIG. 1*

FACILITY FOR RECONCILIATION OF BUSINESS RECORDS USING GENETIC ALGORITHMS

BACKGROUND

Consumers are increasingly reliant upon online resources to research or locate businesses that they may be interested in patronizing. For example, a consumer might search for local Italian restaurants that specialize in southern Italian cuisine. As another example a consumer may search for the closest hardware store where the consumer could purchase tools for a woodworking product. As yet another example, a consumer may browse a horticulture website in order to identify local businesses that can assist in the planning and execution of a backyard landscaping project. For each of these uses, the locality of the business may be important to the consumer, since it reduces the travel time to the business, connects the consumer with businesses having local knowledge such as climate or community standards, and allows the consumer to support local establishments.

In order to aid consumers in identifying local businesses, many websites and other services have been launched that seek to provide local information to consumers. For example, online review sites such as CitySearch and Yelp allow users to search and/or browse a large database of business listings in order to find local goods and services. Such sites allow consumers to specify a number of filtering criteria to enable the consumer to find a desired business. In order to appeal to consumers, local search or information sites often seek to be as comprehensive as possible in the subject matter that they serve. The more business listings that a service can provide, the more likely it is that a consumer will find the business listing in which they are interested. Moreover, it is also important that such sites provide a high degree of accuracy in the business listings that are presented. Because consumers rely upon the sites for contact information for the business or driving directions to the business, inaccurate information can result in frustration for the consumer and lost sales for the business. If consumers don't have a high degree of trust in the information presented on a local site, consumers will not return to the site for additional information in the future.

One of the challenges in presenting comprehensive yet accurate information via a local site is collecting a reliable set of data to present to consumers. There is no single database that contains accurate information about all businesses in the U.S. or abroad, and a site or service operator is typically forced to cobble-together business records from tens or even hundreds of different databases. Such databases may contain conflicting information, may contain incorrect or outdated information, and may be missing information. FIG. 1 depicts an example of three different business records 100, 105, and 110 that may be obtained by an operator of a local site. Each business record contains a number of fields of information that characterize a business. Such fields may include, for example, the name of the business, the street or mail address of the business, the primary or secondary phone number of the business, the latitude and longitude of the business, customer reviews of the business, a URL for the business, and any other information that might be used to characterize the business or its products and services. Each business record may have been obtained from a different data source, for example, the first business record 100 may have been obtained from a first data source, the second business record 105 may have been obtained from a second data source, and the third business record 110 may have been obtained from a third data source.

One of the challenges in obtaining business records from different sources is determining whether the records are related to the same business. For example, street addresses may differ from mailing addresses, phone numbers may differ by one or more digits, businesses may operate under a consumer-facing name and a corporate name, and businesses having the same name but different owners may operate in similar geographic locations. The variety of business information and the lack of trustworthy sources of business information make it extremely difficult to reconcile business records and determine whether any two or more business records relate to the same business or to different businesses. With reference to FIG. 1, for example, the second business record 105 may or may not relate to the same business as the third business record 110. While both records ostensibly relate to a restaurant, the name of the two restaurants in the records is slightly different. Moreover, while the second business record has an incomplete street address, the address of the third business record is a post office box. In such circumstances, a human reviewer will typically need to review the data contained in each record and assess whether the two or more records relate to the same business entity or not. Such a manual process has many limitations, such as being overly reliant upon human judgment and being unable to easily scale to process thousands or tens of thousands of business records. Websites and other services are therefore without an effective mechanism to analyze large numbers of business records in order to compile and provide accurate local information to consumers.

BRIEF DESCRIPTION OF THE DRAWINGS

FIG. 1 depicts a set or representative business records that require reconciliation.

DETAILED DESCRIPTION

Figure 2:
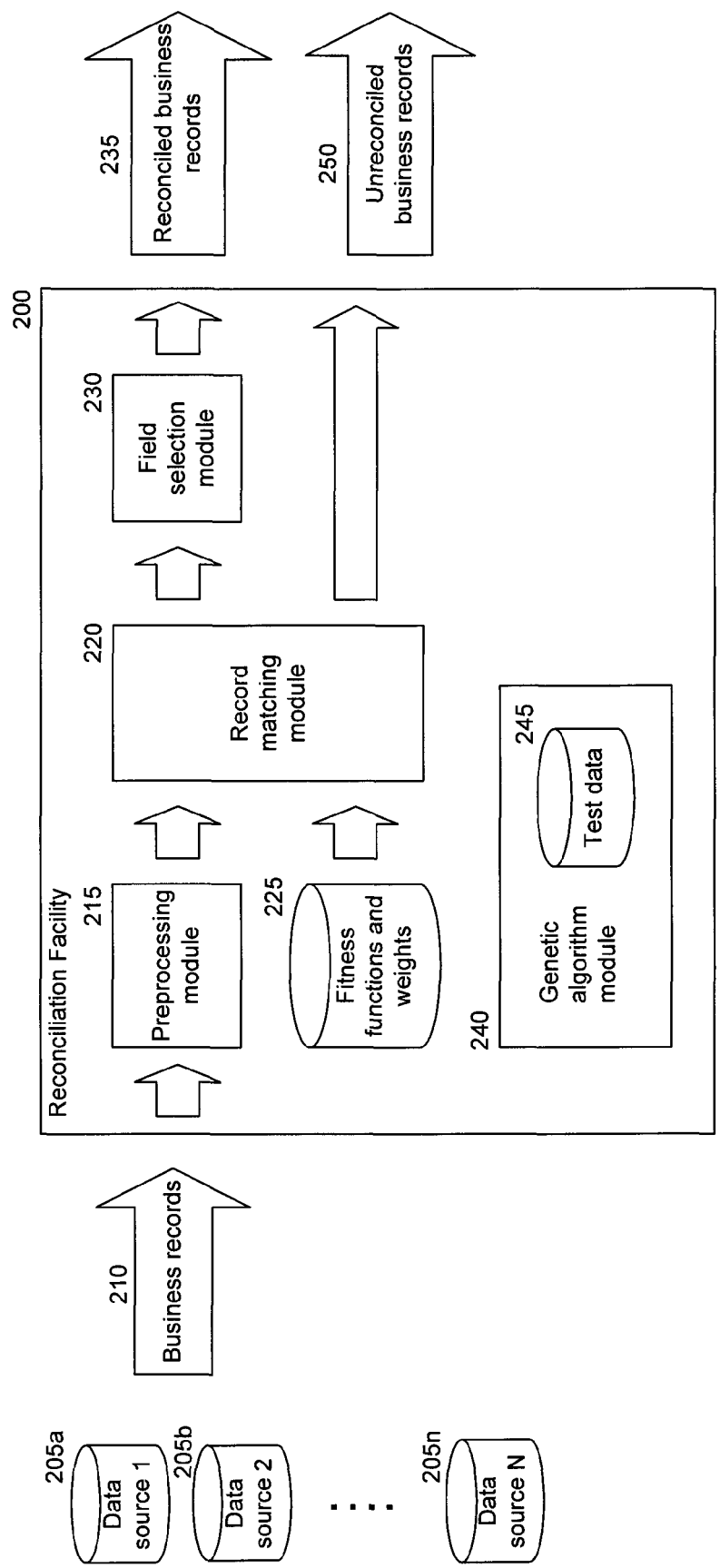
FIG. 2 is a block diagram of a facility for reconciling business records from a number of different sources.

A software and/or hardware facility for the reconciliation of data records pertaining to business entities is disclosed. One or more fitness functions are applied to fields contained in two conflicting business records to assess the similarity of each field. The results of the fitness functions are then weighted and combined to assess the likelihood that the two business records are associated with the same business entity. The fitness functions and weights utilized by the facility are determined by selecting a set of fitness functions and weights and iteratively training the fitness functions and weights against a set of test data, each time breeding, mutating, or replacing fitness functions and weights until a desired performance level is achieved. When the weighted fitness functions are applied to conflicting business records, the fitness functions generate a confidence level that the compared records are associated with the same business entity. If the confidence level exceeds a certain threshold, the facility accepts that the business records refer to the same business entity and synthesizes an authoritative business record from the data records. The resulting business records may be utilized in a local search service or other service that seeks to present business information to users.

In some embodiments, the facility pre-processes the test data before training the fitness functions. The facility may similarly pre-process live data before processing conflicting business records to determine whether the records are associated with the same business entity. Pre-processing the data prior to application of the fitness functions improves the likelihood that the weighted fitness functions will successfully be able to assess the similarity of the analyzed data.

In some embodiments, the facility synthesizes the business records based on an estimation of the reliability of each business record. The reliability of a business record may be based on the source of the business record, reviews associated with the business record, a rating of a review associated with the business record, a precision of the data that is contained in the business record, and other similar factors that suggest the reliability of the underlying data.

In some embodiments, the facility offers a mechanism for users that utilize the presented business record to identify duplicate business records. If the facility is notified of a duplicate of a particular business record, the facility adds the duplicate business record into the test set that is used to train the fitness functions. On a periodic basis, the fitness functions are retrained against the updated test set in order to recalculate the appropriate weights that should be applied to the fitness functions. In additional, new fitness functions may be added to, modified, or removed from the set of fitness functions.

By automatically processing business data using genetic algorithms, the facility is able to quickly process a large number of business records and present the data records to consumers with a minimal amount of manual intervention. The facility disclosed herein is particularly flexible as it allows the fitness functions to evolve over time to accommodate changes in the underlying data.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

As was previously discussed, FIG. 1 depicts a set or representative business records that require reconciliation. While a restaurant is provided as the representative business entity in FIG. 1, it will be appreciated that the business records may pertain to any business that offers goods and/or services to consumers. For example, the record may reflect a business that offers automotive, educational, real estate, food, entertainment, financial, beauty, or any other goods or services. The disclosed facility analyzes business records to determine the likelihood that two or more business records are related to the same business entity. While three business records are depicted in FIG. 1, it will be appreciated that the facility described herein may operate on any two or more business records.

FIG. 2 is a block diagram of a facility 200 for reconciling business records from a number of different data sources 205a, 205b, . . . 205n. Data sources 205a, 205b, . . . 205n may be public data sources, such as corporate records maintained by state agencies, commercial websites offering consumer reviews of products and services, mailing addresses maintained by postal authorities, and any other publicly accessible records. The data sources 205a, 205b, . . . 205n may also be private data sources, such as proprietary databases maintained by marketing agencies, credit agencies, and corporate profiling companies (e.g., Dun and Bradstreet). Private data sources typically are accessed after payment of a fee. The data sources may be accessed by the facility through public or private networks, such as the Internet. The data sources may also be periodically delivered to the facility on a storage medium, such as on a CD-ROM or a DVD.

On a periodic or continuous basis, business records 210 from data sources 205a, 205b, . . . 205n are received by the reconciliation facility 200. The data records may be pushed from the data sources to the facility, or may be individually or in groups pulled from the data sources by the facility. The data may be received in a variety of formats, such as tab-delimited files, and may be coded to identify each field that is contained in the data record. For example, the data may be encoded using SOAP, XML, or any of a variety of commonly-used formats to exchange business data.

The reconciliation facility 200 contains a series of modules which process the received business records 210. A pre-processing module 215 normalizes the received data to allow data records to be more readily compared. As will be described in additional detail herein, such pre-processing may include name processing to remove stop words, to separate numbers from characters, and to remove punctuation. Name processing may also identify and normalize words in the name that indicate a category or geographic area. Pre-processing may also include address processing, such as to truncate and remove certain terms, and phone number processing, to normalize the format of phone numbers. The intent of pre-processing received business records 210 is to place the fields of a data record into a format that may be more accurately compared against the same fields of other data records.

After pre-processing, a record matching module 220 compares two business records to determine the level of similarity between the business records. In order to determine the level of similarity between two business records, the record matching module 220 performs a two-step comparison. First, the record matching module applies one or more fitness functions that measure the similarity between each field in the two business records. Second, the results of the fitness functions that are applied to each field are weighted, and the overall likelihood of similarity between the two business records determined by the weighted fitness function results. The fitness functions and the weights that are applied to each of the fitness functions are stored in a data storage area 225 and accessed by the record matching module.

As will be described in greater detail herein, the fitness functions and weights are generated by a genetic algorithm module 240 which starts with an initial population of fitness functions and weights (each set of weights sometimes referred to as a "chromosome" or "genome") and a set of test data 245 representative of the type of business records that will be analyzed by the reconciliation facility 200. The genetic algorithm module 240 applies the initial population of fitness functions and weights against the set of test data. The results from applying the fitness functions and weights to the set of test data are examined against an expected outcome. Those fitness functions and weights that perform better in identifying matching business records are kept in the population of fitness functions; those fitness functions and weights that perform poorly are removed from the population of fitness functions. The fitness functions and weights are then mutated, or modified, and the mutated set of fitness functions and weights are applied again against the set of test data and evaluated for effectiveness. After a desired confidence level is achieved, the genetic algorithm module 240 stores the resulting fitness functions and weights in the data storage area 225 as production fitness functions and weights. The production fitness functions and weights are used by the record matching module 220 to determine business record similarity. Further details about the operation of the genetic algorithm module 240 are described herein with respect to FIG. 3.

In some cases, two business records compared by the record matching module 220 will match exactly. In those cases, there is no need to reconcile the two records. In most cases, however, the two compared business records will differ from one another. The differences may be very minor, in which case the application of the weighted fitness functions will result in an indication that the two business records are highly likely to pertain to the same underlying business entity. The differences may be significant, in which case the application of the weighted fitness functions will result in an indication that the two business records are very unlikely to pertain to the same underlying business entity. Or the differences may fall somewhere in between, with the record matching module 220 assigning a probability that the two business records pertain to the same underlying business entity. If the probability exceeds a confidence threshold that is set by the facility, the record matching module 220 will indicate that the two compared business records should be reconciled. If, however, the probability does not exceed a confidence threshold, the record matching module 220 will either discard the two compared records or output each of the two compared records as unreconciled business records 250 (i.e., the facility will not attempt to reconcile the records).

For those matching business records that the record matching module 220 determines exceed the confidence threshold, a field selection module 230 selects which fields should be used from the matching records in order to create an authoritative data record associated with each business. The field selection module 230 may select one or more fields from a compared business record based on a completeness of the associated field. For example, data from a phone number field containing "206-555-1234" in one data record may be selected over a phone number field containing "555-1234" in the other data record. The field selection module 230 may also select one or more fields from a business record based on an estimation of the reliability of the business record. The reliability of a business record may be based on the source of the business record, reviews associated with business record, a rating of a review associated with the business record, a precision of the data that is contained in a business record and other similar factors that suggest the reliability of the underlying data. In some cases, the data from all fields in one business record may be selected over the data in the fields of the other business record. In some cases, data may be selected from each of the compared business records in order to construct the reconciled business record associated with the business entity.

Once the field selection module 230 is complete, authoritative business records 235 are output from the facility. Such records may be displayed to consumers in various applications, such as a local search service or other service that seeks to present business information to public and private users. Users that utilize the presented business records may be allowed to identify any duplicates in the records. If the facility is notified of duplicates of a particular business record, the facility adds the duplicate business records into the test set that is used to train the fitness functions.

On a periodic basis, the genetic algorithm module 240 in the reconciliation facility retrains the fitness functions and recalculates the weights of the production fitness functions. The genetic algorithm module 240 applies the production fitness functions and weights against the set of test data. The test data contains the business records that were initially used to generate the production fitness functions, as well as subsequent duplicate business records that were identified by users of the data. The results from applying the production fitness functions and weights to the set of test data are examined against an expected outcome. Those production fitness functions and weights that perform better in identifying matching business records are kept in the population of fitness functions; those production fitness functions and weights that perform poorly are removed from the population of fitness functions. In this manner, the performance of the reconciliation facility improves over time.

Those skilled in the art will appreciate that the reconciliation facility 200 may be implemented on any computing system. Suitable computing systems include personal computers, server computers, hand-held or laptop devices, multiprocessor systems, microprocessor-based systems, programmable consumer electronics, network devices, minicomputers, mainframe computers, distributed computing environments that include any of the foregoing, and the like. Such computing systems may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

Figure 3:
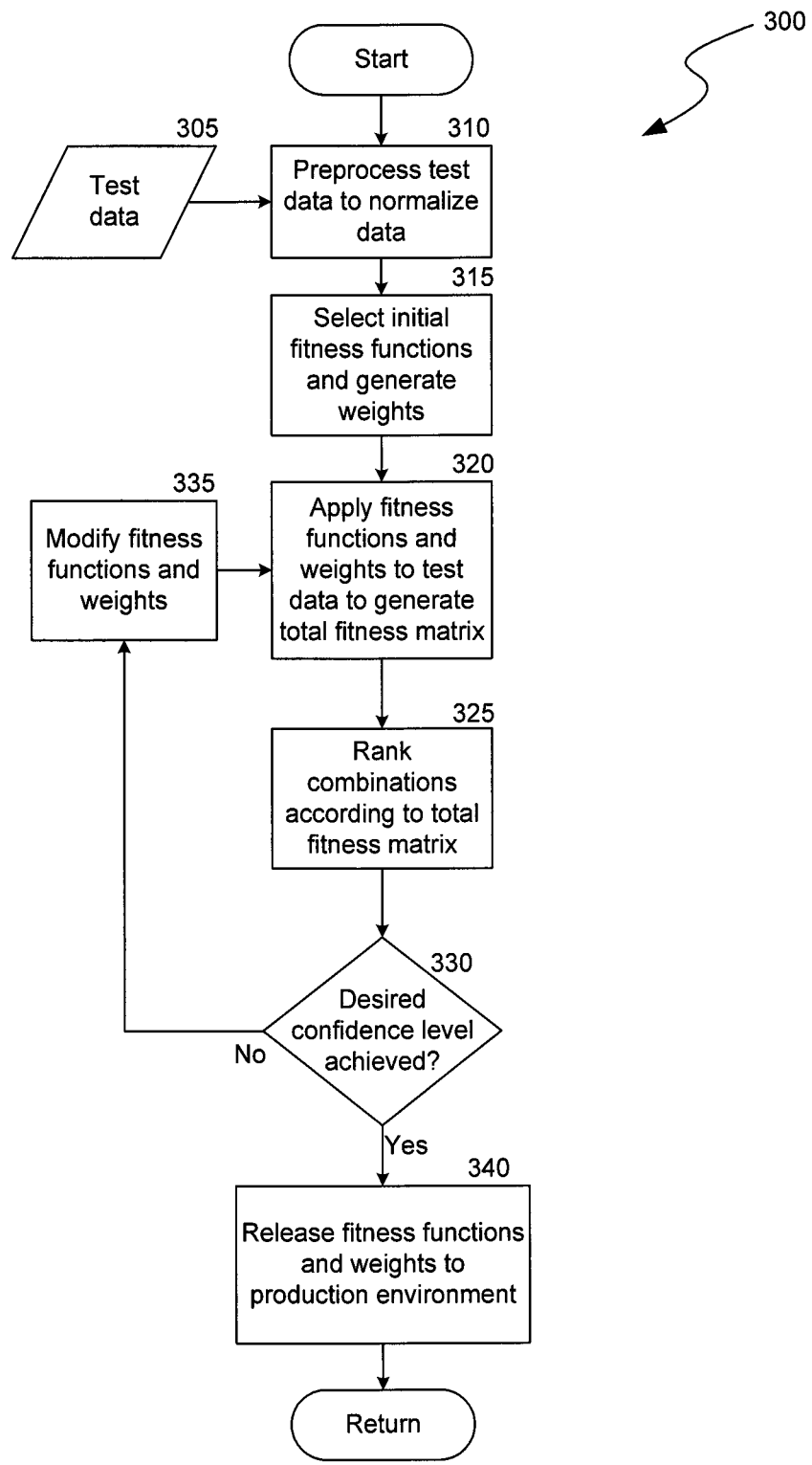
FIG. 3 is a flow diagram of a training routine implemented by the facility to generate a set of production fitness functions and weights for reconciliation of business records.

FIG. 3 is a flow diagram of a training routine 300 implemented by the genetic algorithm module 240 to generate a set of production fitness functions and weights for reconciliation of business records. In order to generate a set of production fitness functions, the genetic algorithm module starts with a block of test data 305. The test data 305 is comprised of one or more pairs of business records. Approximately half of the pairs of test business records are intended to be associated with a common business entity, meaning that if the pair of business records were received in a production environment, the facility should detect the similarity between the two records and merge or otherwise utilize the data contained in the records. Approximately half of the pairs of test business records are intended to not be associated with a common business entity, meaning that if the pair of business records were received in a production environment, the facility should determine that the two records are associated with different business entities and therefore should not be merged. The test data 305 may be manually selected by a facility operator so that it contains a representative sampling of the type of discrepancies that typically occur between business records (e.g., the type of discrepancies that was previously discussed with respect to FIG. 1). As will subsequently described, the test data 305 may also be automatically selected by processes in a production environment that are designed to catch duplicate business records. The test data should contain a reasonable number of pairs of business records to ensure appropriate training and selection of fitness functions having a desired level of performance by the facility. Under certain circumstances, it was found that approximately fifty pairs of business records were sufficient to train the fitness functions and achieve a desired initial level of accuracy.

Once test data has been selected, at a block 310 the genetic algorithm module 240 initially pre-processes the test data 305 to normalize the test data. The pre-processing that is performed on the test data is the same as the pre-processing that is applied by the pre-processing module 215. The purpose of pre-processing the test data in a similar fashion to the pre-processing that is applied to the business records 210 is to ensure that the fitness functions and weights that are selected by the genetic algorithm module achieve similar results under training conditions as will be achieved when the fitness functions and weights are released for use in the production environment.

At a block 315, the genetic algorithm module 240 selects an initial set of fitness functions and a set of weights (each of the set of weights often referred to as a "chromosome" or a "genome") that will be used to derive a set of production fitness functions and weights. The fitness functions are any functions that can be applied to and quantify the similarity between the contents of a field in two or more business records or the contents of concatenated fields from two or more business records. For example, an adjacency matrix fitness function may be utilized which steps through the characters in a first record field and compares each character in the first record field with the character in the same position, the immediately preceding position, and the immediately following position in a second record field. As another example, a tokenizing fitness function may be utilized, such as a comparison between a sliding window of two character length that is applied to a first record field and a second record field. Other fitness functions will be apparent to one skilled in the art. The facility may apply the same fitness function to all fields in each business record being compared, or may apply different fitness functions to each of the fields in the records being compared. The selection of the initial set of fitness functions and weights may be automatically performed by the facility, or a facility operator may select the initial set of fitness functions and weights based on the anticipated performance of the selected fitness functions and weights.

In some embodiments, the fields that are compared by the genetic algorithm module 240 to determine a level of similarity between business records are the following: (1) the business name; (2) street address; (3) phone; (4) the concatenated business name and street address; (5) the concatenated street address and zip; (6) the concatenated city, state, and zip; and (7) geo-coordinates (i.e., latitude and longitude). It will be appreciated that the geo-coordinates associated with a business record may be contained in the received business record, or may be derived from the received business record by sending the street address, city, and state to a third party service that converts addresses to geo-coordinates. In addition to an individual comparison, the "address" field and "name" field are concatenated and compared to determine how much the two fields have a covariance. The "name" field is overweighted by comparing the field twice since the name of a business is typically the single most important field in determining a level of similarity between records. Moreover, street address and zip are concatenated and compared, as are the city, state and zip. More generally, the contents from one or more fields in a business record may be concatenated and compared against the contents of the corresponding one or more fields from another business record in order to more accurately assess the similarities between the two business records. A fitness function is applied to each of the seven fields identified above, and an overall confidence level calculated by weighting each of results from the individual fitness functions. In some embodiments, the weighted results from the application of the individual fitness functions are summed to arrive at a confidence level for each pair of business records.

To generate a set of production fitness functions, the genetic algorithm module 240 starts with a large population of initial fitness functions and weights. In some embodiments, several hundred combinations of fitness functions and weights are applied to the test data. In some embodiments, the weights that are applied to the fitness functions are randomly generated before iterative testing by the genetic algorithm module 240. In some embodiments, the weights that are applied to the fitness functions are manually generated before iterative testing by the genetic algorithm module. Manual generation allows the facility operator to make an initial prediction as to the value of each field when assessing the similarity between two business records.

At a block 320, the selected fitness functions and weights are applied to the business records. If fifty business records are contained in the test set, and if seven fields or combinations of fields are being compared for each business record, the application of the fitness functions would produce a 7×50 matrix of results (the "fitness results matrix" ($fr_{1,1} \ldots fr_{7,50}$)) as shown in equation 1 below. The fitness results matrix is then multiplied by a set of weights ($w_1 \ldots w_7$) to arrive at a total fitness matrix ($tf_1 \ldots tf_{50}$). The total fitness matrix reflects the overall ability of the selected and weighted fitness functions to determine similarity between pairs of business records across all test cases.

$$[w_1 w_2 w_3 w_4 w_5 w_6 w_7] \times \begin{bmatrix} fr_{1,1} fr_{1,2} \ldots fr_{1,50} \\ \ldots \\ fr_{7,1} fr_{7,2} \ldots fr_{7,50} \end{bmatrix} = [tf_1 tf_2 \ldots tf_{50}]$$

A total fitness matrix is calculated for each combination of fitness functions and weights that are being tested by the genetic algorithm module 240. For example, if several hundred combinations of fitness functions and weights are being tested by the facility, several hundred total fitness matrices are generated by the genetic algorithm module. For ease of comparison, the total fitness matrix results may be converted into a single number that is more readily compared with other total fitness matrix results. For example, each of the numbers contained in the total fitness matrix may be averaged with the other numbers to produce a single number that reflects how accurately the particular combination of fitness functions and weights predicts similarity across all business records in the test data. The resulting number may then be converted to a 100 point scale so that the number may be interpreted as a percentage. For example, a particular combination of fitness functions and weights may be said to predict similarity between two business records in the test data at an 82% confidence level.

At a block 325, all combinations of fitness functions and weights that were tested by the genetic algorithm module 240 at block 320 are ranked in accordance with the total fitness matrix results. Combinations are thereby ranked from the best performing combinations (i.e., those fitness functions and weights having the greatest likelihood of predicting similarity between business records) to the poorest performing combinations (i.e., those fitness functions and weights having the least likelihood of predicting similarity between business records).

At a decision block 330, the genetic algorithm module 240 examines the ranked list of combinations to determine if a desired confidence level (a "confidence threshold") is achieved. Preferably, the genetic algorithm module selects one or more combinations of fitness functions and weights for release into the production environment. The confidence threshold is set at a sufficiently high enough level to establish a reasonable certainty that the production fitness functions and weights will accurately reconcile business records when applied against live data. For example, in some embodiments, the confidence threshold is set at 90-95%, meaning that the total fitness number calculated as result of the comparison of data records must equal or exceed a score of 90-95. A 90-95% confidence level when applied to test data has been found to produce production fitness functions and weights that work sufficiently well when released to the live environment. If the highest ranked combinations do not yet achieve a desired confidence level at decision block 330, processing continues to a block 335.

At a block 335, the genetic algorithm module 240 modifies the set of previously-selected combinations of fitness functions and weights. The genetic algorithm module may modify the set in a variety of ways. For example, the genetic algorithm module may drop the lowest-performing combinations from further consideration. As another example, the genetic algorithm module may mutate a number of the combinations by introducing a random change to one or more of the weights or fitness functions contained in each combination. As yet another example, the genetic algorithm module may breed a number of new combinations. Breeding combinations involve combining elements from two or more previously-considered combinations. As yet another example, the genetic algorithm module may introduce one or more completely new combinations in the set of fitness functions and weights to be further tested.

Once new and modified combinations of fitness functions and weights have been selected by the genetic algorithm module 240, the combinations are applied to the test data and the total fitness matrix for each combination calculated (block 320), the combinations are ranked in accordance with the total fitness matrix (block 325), and a test is performed to determine whether the new set of combinations meet the confidence threshold of the facility (decision block 330). The process represented by blocks 320-335 is iteratively applied to test new sets of combinations, each time the better performing combinations rising to the top and the poorer performing combinations falling to the bottom. The iterative process allows the genetic algorithm module to quickly identify a number of optimal combinations of fitness functions and weights for the production environment.

If the desired number of combinations exceeds the confidence threshold at decision block 330, processing continues to block 340. At block 340, the selected combinations of fitness functions and weights are released by the genetic algorithm module 240 to the production environment. The released combinations (the "production fitness functions and weights") have a high degree of accuracy in predicting similarity between business records in the test data. For example, as previously noted, in some applications it is desirable to have the production fitness functions and weights be able to predict similarity between test business records at a 90-95% level of confidence in such analysis.

Figure 4:
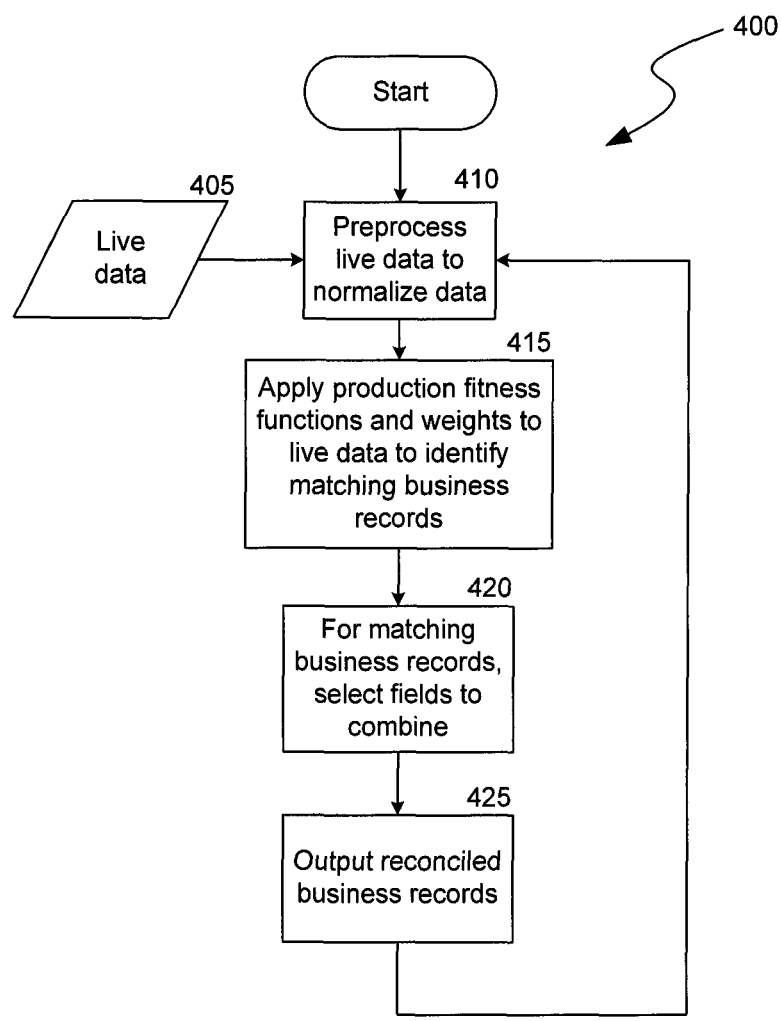
FIG. 4 is a flow diagram of a reconciliation routine implemented by the facility to utilize a set of production fitness functions and weights for reconciliation of business records.

Once production fitness functions and weights have been released by the genetic algorithm selection module, the facility 200 may reconcile received business records 210. FIG. 4 is a flow diagram of a reconciliation routine 400 implemented by the facility 200 to utilize a set of production fitness functions and weights for reconciliation of business records. The facility operates on live data 405, which is received from one or more data sources 205a, 205b, ... 205n. The live data 405 may contain business records that are not currently in an authoritative database maintained by the facility, or may contain business records that are duplicative of or which supplement business records that are maintained by the facility. In order to utilize the received data 405, the facility should detect the similarity between any two business records (i.e., between two new records or between one new record and one existing record) and merge or otherwise utilize the data contained in the records.

At a block 410, the facility pre-processes the live data 405 to normalize the data. Such pre-processing may include one or more of the following types of processing:

Processing to remove common words such as "the," "is," "an," etc.

Processing to remove punctuation, such as commas, periods, etc.

Processing to normalize certain words, such as converting all ordinal numbers to the corresponding numeric representation (e.g., "first" to "1st," "third" to "3rd").

Processing to separate numbers from characters (e.g., to change "1st" by inserting a space to form "1st").

Processing to identify and normalize words in a name that indicate a category or geographic area, such as converting all instances of "Avenue" to "Ave".

Processing to shorten certain long words to limit the ability of long words to result in an over-correlation between data records. For example, "Northwest" may be shortened to "NW" in addresses. Shortening prevents addresses such as "15th Ave Northwest" from having a high correlation with "5th Ave Northwest."

Processing to resolve acronyms or to resolve identification of professional degrees (e.g., "Dr.", "Esq.").

Processing to remove words that specify a category, such as "restaurant" or "gift shop."

Processing to normalize certain address terms, such as converting all instances of "Post Office Box" to "PO Box."

Processing to place all phone numbers into a common format (e.g., "2065551234" into "206-555-1234").

The intent of pre-processing received business records is to place the fields of a data record into a format that may be more accurately compared against the same fields of other data records.

Once pre-processing has been completed, at a block 415 the facility applies the production fitness functions and weights to the received business records in order to identify those data records that correspond to the same business entity. The facility compares the same fields as were compared by the genetic algorithm module 240 to determine a level of similarity between business records, namely: (1) the business name; (2) street address; (3) phone; (4) the concatenated business name and street address; (5) the concatenated street address and zip; (6) the concatenated city, state, and zip; and (7) geo-coordinates (i.e., latitude and longitude). It will be appreciated that the geo-coordinates associated with a business record may be contained in the received business record, or may be derived from the received business record by sending the street address, city, and state to a third party service that converts addresses to geo-coordinates. When applied to the received business records, the production fitness functions and weights generate a probability that the compared data records pertain to the same business entity. The facility operator may set a confidence threshold that the probability needs to exceed in order for the compared data records to be assumed to relate to the same business entity. In the production environment, the selected confidence level will typically be less than the confidence level used to initially select the production fitness functions. For example, in some embodiments the production confidence threshold is set at 70-75%, meaning that the total fitness number calculated as result of the comparison of data records must equal or exceed a score of 70 to 75. A 70-75% confidence level has been found to be a reasonable level of accuracy in most applications involving presentation of business records to consumers, where a tradeoff is typically made between accuracy and desire to maximize the number of business listings that are presented to consumers.

At a block 420, for those business records that were found to relate to the same business entity, the facility selects one or more fields from each business record to combine into an authoritative business record. As previously described, the facility may select one or more fields from a compared business record based on a completeness of the associated field. The facility may also select one or more fields from a business record based on an estimation of the reliability of the business record. The reliability of a business record may be based on the source of the business record, reviews associated with the business record, a rating of a review associated with the business record, a precision of the data that is contained in the business record and other similar factors that suggest the reliability of the underlying data. In some cases, the data from all fields in one business record may be selected over the data in the fields of the other business record. In some cases, data may be selected from each of the compared business records in order to construct the reconciled or authoritative business record associated with the business entity.

At a block 425, the facility outputs the reconciled business records. Such records may be displayed to consumers in various applications, such as a local search service or other service that seeks to present business information to public and private users. The facility may also output the unreconciled business records, or the facility may discard such business records depending on the reliability of the source from which they were received. Processing then returns to block 410 to process additional business records that are received by the facility. The processing in blocks 410-425 may be performed on a continuous basis or on a batch basis, such as when business records are received from the external data sources.

Those skilled in the art will appreciate that blocks 420 and 425 may be performed by the facility immediately after each pair of business records is analyzed, or may be performed by the facility at a subsequent time. For example, the facility may flag pairs of business records as being candidates to be reconciled, and the business records may later be merged by the facility. The subsequent reconciliation may be performed in a batch process where efficiencies may be gained in processing a large number of like business records.

Figure 5:
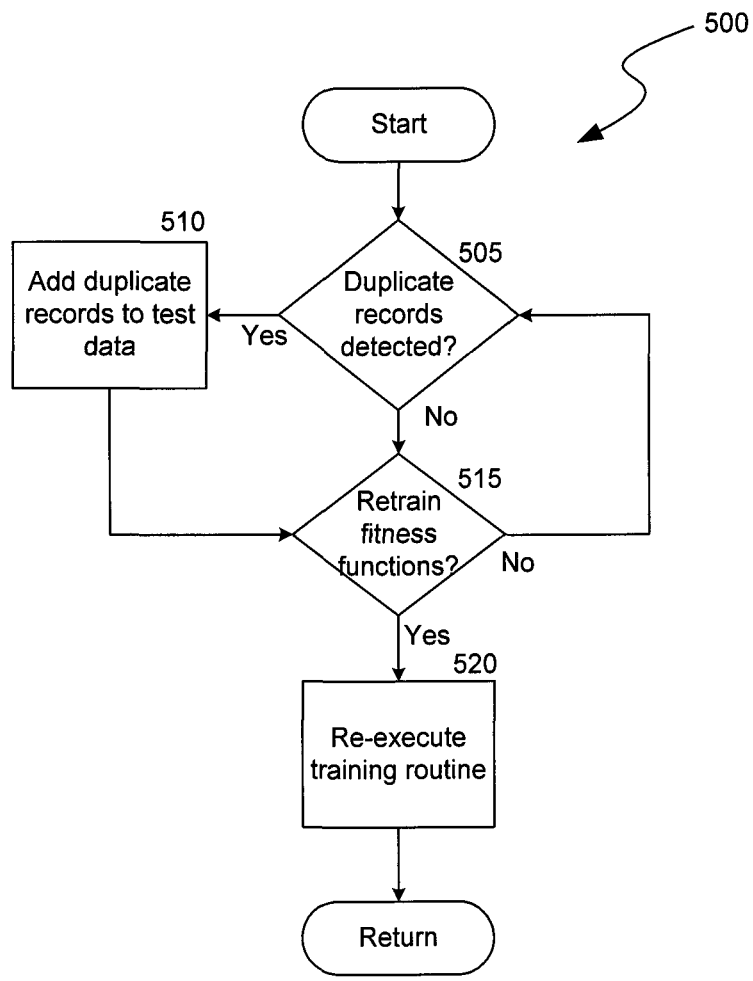
FIG. 5 is a flow diagram of an optimization routine implemented by the facility to periodically retrain the production fitness functions and weights.
Figure 6:
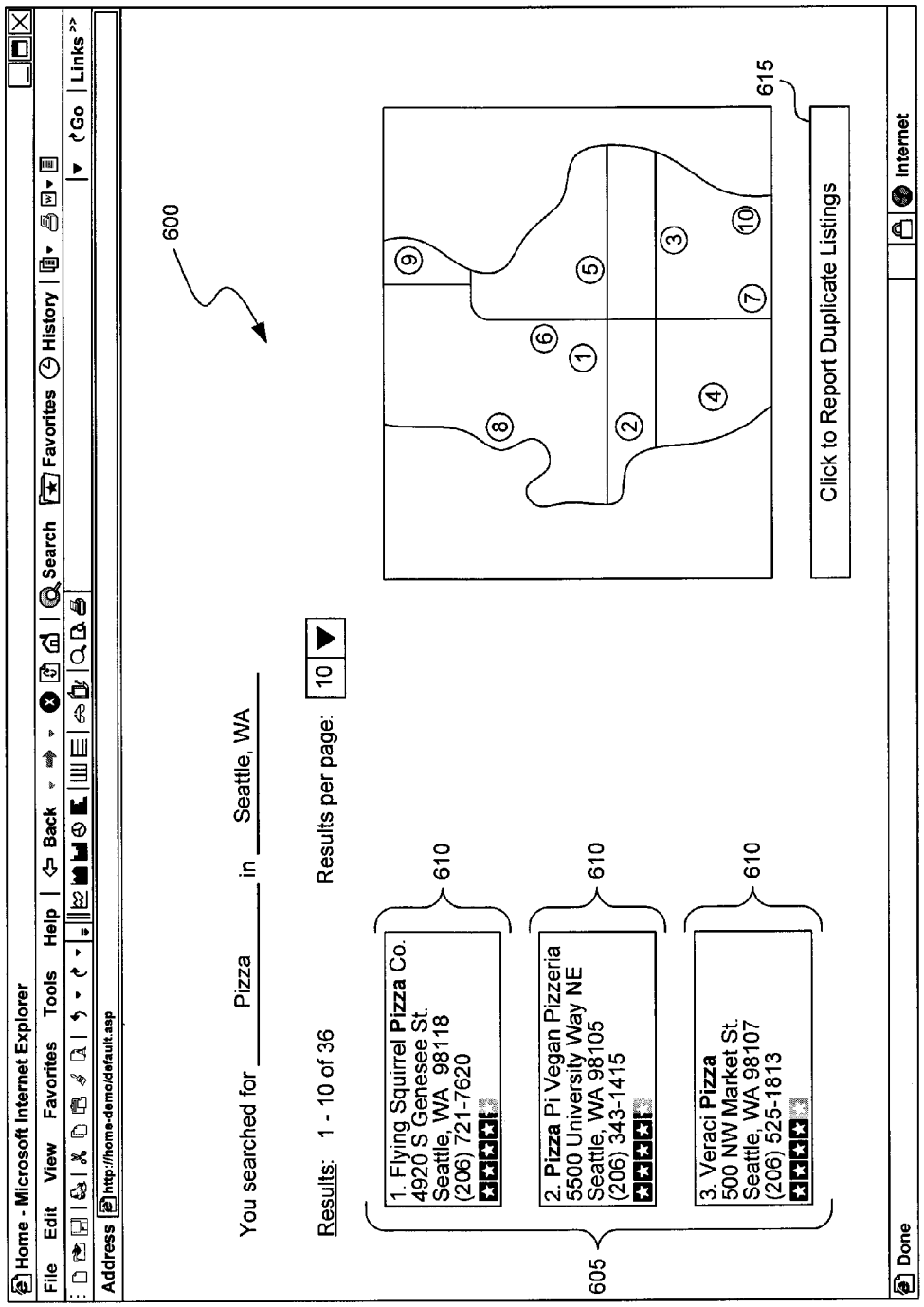
FIG. 6 is a representative screen shot of a user interface that enables feedback on the accuracy of reconciled business records.

FIG. 5 is a flow diagram of an optimization routine 500 implemented by the facility 200 to periodically retrain the production fitness functions and weights. At a decision block 505, the facility receives an indication that a duplicate record exists for a displayed business record. Such indication typically is received from a consumer, business owner, or other user of a service that displays the business record. For example, FIG. 6 is a representative screen shot of a user interface 600 that enables a consumer, business, or other user to provide feedback on the accuracy of displayed business records. The screen shot displays a portion of a set of search results 605, such as might be presented to a user after the user submits a search query looking for a local business. Each of the search results includes identifying data 610 about the presented business, such as the business name, address, telephone number, hours, etc. To allow a user to indicate that there are duplicate records (i.e., records associated with the same business) in the displayed search results, the interface includes a button 615 or other control that may be selected by the user. When selected by the user, the user is presented with check-boxes or another input mechanism (not shown) to allow the user to identify the two or more records in the presented results that reflect the same business and which should therefore be merged.

Returning to FIG. 5, if a duplicate business record is detected at decision block 505, processing continues to a block 510. At block 510, the facility adds the two records that are duplicates to the test data. The existence of duplicate business records may be a result of a failure of the weighted fitness functions to detect the existence of the similar records. As a result, the duplicate business records are added to the test data so that the fitness functions may be re-trained to recognize the condition that originally led to a failure to recognize the similarity between the two business records.

Whether duplicate data records were detected or not at block 505, processing continues to a decision block 515. At decision block 515, the facility determines whether the production fitness functions need to be retrained. The facility may elect to retain the production fitness functions on a periodic basis, such as every calendar quarter or once a year. The facility may also elect to retrain the production fitness functions when a sufficient number of new records have been added to the test data. For example, the facility may elect to retrain the production fitness function when the number of test records contained in the set of test data increases by more than ten percent. If the facility determines that it is not time to retrain the production fitness functions, processing loops back to decision block 505 where the facility continues to gather evidence of duplicate records. If, however, the facility determines that it is time to retrain the fitness functions, processing continues to a block 520.

At a block 520, the facility re-executes the training routine 300 that is depicted in FIG. 3. When retraining, various combinations of the production fitness functions and weights are again iterated against the test data in order to identify those weighted fitness function combinations that perform the best against the test data. Upon the completion of retraining, the best weighted fitness function performers are then re-released to the production environment as updated production fitness functions and weights. Retraining may occur as often as is necessary to maintain the accuracy of the production fitness functions in detecting similarity of business records.

It will be appreciated that the disclosed facility offers significant improvements over prior methods of reconciling business data. In particular, the disclosed facility is able to reconcile data records in an automated fashion. As a result, the facility can easily scale to process a significant number of data records from a large number of data sources in a timely fashion. In addition, because the facility relies upon a confidence level determination to identify a match between data records, rather than rely upon an exact match, the facility is able to reconcile and present significantly more business records to consumers. Consumers therefore benefit from the disclosed technology since they are able to access and utilize a broader array of commercial data.

In addition to consumers benefiting from the disclosed facility, business entities and other parties associated with business listings also benefit from the accurate reconciliation of business listings. For example, listings and other content (e.g., reviews, directions, ratings) that are associated with a business may be scattered across different network locations, such as across a multitude of Web sites. The disclosed facility enables all network instances associated with a specific business entity to be mapped to that business entity. Links may be provided to the locations where the business listings and content exists, or the listings and content may be aggregated at a single location. By aggregating the disparate listings and content, the disclosed facility enables a business entity to see at a single location how it is represented online across a multitude of Web sites without having to explicitly visit those sites. The information presented to the business entity can help it understand its online reputation (based on items such as consumer reviews), as well the extent to which listings of elements like phone number and address are in fact accurately represented.

As another example, the disclosed facility enables a business listing to be automatically created for a business entity without the direct participation of the business entity. Such listings may then be presented to consumers in various services that help or promote the business entity, such as directory services, mapping services, review services, etc. Business entities benefit from such an arrangement because they are automatically included in services without having to directly provide information to each and every service. Moreover, the information presented on behalf of the business entity has a greater likelihood of being accurate While various embodiments are described in terms of the environment described above, those skilled in the art will appreciate that the facility may be implemented in a variety of environments including a single, monolithic computer system, a distributed system, as well as various other combinations of computer systems or similar devices connected in various ways. Moreover, the facility may utilize third-party services and data to implement all or portions of the aforementioned functionality. Those skilled in the art will also appreciate that the steps shown in FIGS. 3-5 may be altered in a variety of ways. For example, the order of the steps may be rearranged, substeps may be performed in parallel, steps may be omitted, or other steps may be included.

From the foregoing, it will be appreciated that specific embodiments of the invention have been described herein for purposes of illustration, but that various modifications may be made without deviating from the invention. Accordingly, the invention is not limited except as by the appended claims.

We claim:

1. A computer-implemented method of matching and reconciling business records using fitness functions, the computer-implemented method comprising:

for each field in a first business record that is to be compared with a corresponding field in a second business record, selecting a production fitness function to be applied to compare the contents of the field in the first and second business records and a weight that is to be applied to the result of the applied production fitness function by:

applying test fitness functions to fields contained in a plurality of test business records to determine fitness function results, weighting each fitness function result by an associated weight, and calculating an overall performance of the test fitness functions based on the weighted fitness function results across the plurality of test business records;

repeating the application of test fitness functions until an overall performance of one or more weighted test fitness functions exceeds a first confidence threshold, wherein the test fitness functions and associated weights are modified for each repeat application; and selecting at least one of the test fitness functions and weights that exceed the first confidence threshold as production fitness functions and weights;

applying the selected production fitness functions for each field in the first business record that is to be compared with a corresponding field in the second business record;

weighting the results of the applied production fitness functions to calculate a confidence level that the first business record and the second business record are associated with the same business entity;

combining the first business record and the second business record into an authoritative business record if the calculated confidence level exceeds a second confidence threshold;

soliciting feedback on an accuracy of the authoritative business record by causing a query to be displayed of whether a duplicate record of the authoritative business record exists;

upon receiving a response to the query indicating that a duplicate record of the authoritative business record exists, updating the plurality of test business records by adding the duplicate record and the authoritative business record to the plurality of test business records; and retraining the production fitness functions and weights against the updated plurality of test business records.

2. The computer-implemented method of claim 1, further comprising pre-processing the plurality of test business records to normalize the test business records before applying the test fitness functions.

3. The computer-implemented method of claim 1, further comprising pre-processing the first business record and second business record to normalize the business records before applying the production fitness functions.

4. The computer-implemented method of claim 3, wherein pre-processing comprises removing common words, removing punctuation, and removing words that specify a category.

5. The computer-implemented method of claim 3, wherein pre-processing comprises shortening long words to minimize the impact long words have on correlation.

6. The computer-implemented method of claim 3, wherein pre-processing comprises normalizing words and phrases.

7. The computer-implemented method of claim 1, wherein the test fitness functions are selected from the group consisting of an adjacency matrix fitness function and a tokenizing fitness function.

8. The computer-implemented method of claim 1, wherein the first confidence threshold is between 90 percent and 100 percent.

9. The computer-implemented method of claim 1, wherein the second confidence threshold is between 70 percent and 100 percent.

10. The computer-implemented method of claim 1, wherein merging the first business record and second business record comprises:
- determining a reliability of a first data source for each field in the first business record;
- determining a reliability of a second data source for each field in the second business record; and
- selecting fields from the business record associated with the data source having a higher reliability for that field.

11. The computer-implemented method of claim 1, wherein soliciting feedback on an accuracy of the authoritative business record comprises displaying the authoritative business record to consumers.

12. A system for matching and reconciling business records using fitness functions, the system comprising:
- a memory storing computer-executable instructions of:
  - a genetic algorithm module that, for each field in a first business record that is to be compared with a corresponding field in a second business record, selects a production fitness function to be applied to compare the contents of the field in the first and second business records and a weight that is to be applied to the result of the applied production fitness function by:
    - applying test fitness functions to fields contained in a plurality of test business records to determine fitness function results, weighting each fitness function result by an associated weight, and calculating an overall performance of the test fitness functions based on the weighted fitness function results across the plurality of test business records;
    - repeating the application of test fitness functions until an overall performance of one or more weighted test fitness functions exceeds a first confidence threshold, wherein the test fitness functions and associated weights are modified for each repeat application; and
    - selecting at least one of the test fitness functions and weights that exceed the first confidence threshold as production fitness functions and weights;
  - a record matching module that applies the production fitness functions selected by the genetic algorithm module to each field in the first business record that is to be compared with a corresponding field in the second business record, and weights the results of the applied production fitness functions using the weights selected by the genetic algorithm module to calculate a confidence level that the first business record and the second business record are associated with the same business entity;
  - a field selection module that merges the first business record and the second business record into an authoritative business record if the confidence level calculated by the record matching module exceeds a second confidence threshold; and
  - an evaluation module that solicits feedback on an accuracy of the authoritative business record by causing a query to be displayed of whether a duplicate record of the authoritative business record exists, and, upon receiving a response to the query indicating that a duplicate record of the authoritative business record exists, the genetic algorithm module further:
    - updates the plurality of test business records by adding the duplicate record and the authoritative business record to the plurality of test business records; and
    - retrains the production fitness functions and weights against the updated plurality of test business records; and
- a processor for executing the computer-executable instructions stored in the memory.

13. The system of claim 12, further comprising a pre-processing module that pre-processes the plurality of test business records to normalize the business records before the genetic algorithm module applies the test fitness functions.

14. The system of claim 12, further comprising a pre-processing module that pre-processes the first business record and second business record to normalize the business records before the record matching module applies the production fitness functions.

15. The system of claim 14, wherein pre-processing comprises removing common words, removing punctuation, and removing words that specify a category.

16. The system of claim 14, wherein pre-processing comprises shortening long words to minimize the impact long words have on correlation.

17. The system of claim 14, wherein pre-processing comprises normalizing words and phrases.

18. The system of claim 12, wherein the test fitness functions are selected from the group consisting of an adjacency matrix fitness function and a tokenizing fitness function.

19. The system of claim 12, wherein the first confidence threshold is between 90 percent and 100 percent.

20. The system of claim 12, wherein the second confidence threshold is between 70 percent and 100 percent.

21. The system of claim 12, wherein the field selection module merges the first business record and second business record by:
- determining a reliability of a first data source for each field in the first business record;
- determining a reliability of a second data source for each field in the second business record; and
- selecting fields from the business record associated with the data source having a higher reliability for that field.

22. A computer-implemented method of matching and reconciling business records using fitness functions, the computer-implemented method comprising:
- for each field or concatenated fields in a first business record that are to be compared with a corresponding field or concatenated fields in a second business record, selecting a production fitness function to be applied to compare the contents of the field or concatenated fields in the first and second business records and a weight that is to be applied to the result of the applied production fitness function by:
  - repeatedly applying test fitness functions to fields or concatenated fields contained in a plurality of test business records and weighting the results until an overall performance of one or more weighted test fitness functions exceeds a first confidence threshold; and
  - selecting at least one of the test fitness functions and weights that exceed the first confidence threshold as production fitness functions and weights;
- applying the selected production fitness functions to each field or concatenated fields in the first business record that are to be compared with a corresponding field or concatenated fields in the second business record;
- weighting the results of the applied production fitness functions to calculate a confidence level that the first business record and the second business record are associated with the same business entity;

flagging that the first business record and the second business record should be combined into an authoritative business record if the calculated confidence level exceeds a second confidence threshold;

soliciting feedback on an accuracy of the authoritative business record by causing a query to be displayed of whether a duplicate record of the authoritative business record exists;

upon receiving a response to the query indicating that a duplicate record of the authoritative business record exists, updating the plurality of test business records by adding the duplicate record and the authoritative business record to the plurality of test business records; and retraining the production fitness functions and weights against the updated plurality of test business records.

23. The computer-implemented method of claim 22, further comprising pre-processing the plurality of test business records to normalize the test business records before applying the test fitness functions.

24. The computer-implemented method of claim 22, further comprising pre-processing the first business record and second business record to normalize the business records before applying the production fitness functions.

25. The computer-implemented method of claim 24, wherein pre-processing comprises removing common words, removing punctuation, and removing words that specify a category.

26. The computer-implemented method of claim 24, wherein pre-processing comprises shortening long words to minimize the impact long words have on correlation.

27. The computer-implemented method of claim 24, wherein pre-processing comprises normalizing words and phrases.

28. The computer-implemented method of claim 22, wherein the test fitness functions are selected from the group consisting of an adjacency matrix fitness function and a tokenizing fitness function.

29. The computer-implemented method of claim 22, wherein the first confidence threshold is between 90 percent and 1100 percent.

30. The computer-implemented method of claim 22, wherein the second confidence threshold is between 70 percent and 1100 percent.

31. The computer-implemented method of claim 22, further comprising merging a flagged first business record and a second business record into an authoritative business record.

32. The computer-implemented method of claim 31, wherein merging the first business record and the second business record comprises:
determining a reliability of a first data source for each field in the first business record;
determining a reliability of a second data source for each field in the second business record; and
selecting fields from the business record associated with the data source having a higher reliability for that field.

33. The computer-implemented method of claim 22, soliciting feedback on the authoritative business record comprises displaying the authoritative business record to consumers.

34. A system for matching and reconciling business records using fitness functions, the system comprising:
a memory storing computer-executable instructions of:
a genetic algorithm module that, for each field or concatenated fields in a first business record that are to be compared with a corresponding field or concatenated fields in a second business record, selects a production fitness function to be applied to compare the contents of the field or concatenated fields in the first and second business records and a weight that is to be applied to the result of the applied production fitness function by:
repeatedly applying test fitness functions to fields or concatenated fields contained in a plurality of test business records and weighting the results until an overall performance of one or more weighted test fitness functions exceeds a first confidence threshold; and
selecting at least one of the test fitness functions and weights that exceed the first confidence threshold as production fitness functions and weights;
a record matching module that:
applies the production fitness functions selected by the genetic algorithm module to each field or concatenated fields in the first business record that are to be compared with a corresponding field or concatenated fields in the second business record;
weights the results of the applied production fitness functions to calculate a confidence level that the first business record and the second business record are associated with the same business entity; and
if the calculated confidence level exceeds a second confidence threshold, flags that the first business record and the second business record should be combined into an authoritative business record;
an evaluation module that solicits feedback on an accuracy of the authoritative business record by causing a query to be displayed of whether a duplicate record of the authoritative business record exists, and, upon receiving a response to the query indicating that a duplicate record of the authoritative business record exists, the genetic algorithm module further:
updates the plurality of test business records by adding the duplicate record and the authoritative business record to the plurality of test business records; and
retrains the production fitness functions and weights against the updated plurality of test business records; and
a processor for executing the computer-executable instructions stored in the memory.

35. The system of claim 34, further comprising a pre-processing module that pre-processes the plurality of test business records to normalize the test business records before applying the test fitness functions.

36. The system of claim 34, further comprising a pre-processing module that pre-processes the first business record and second business record to normalize the business records before applying the production fitness functions.

37. The system of claim 36, wherein pre-processing comprises removing common words, removing punctuation, and removing words that specify a category.

38. The system of claim 36, wherein pre-processing comprises shortening long words to minimize the impact long words have on correlation.

39. The system of claim 36, wherein pre-processing comprises normalizing words and phrases.

40. The system of claim 34, wherein the test fitness functions are selected from the group consisting of an adjacency matrix fitness function and a tokenizing fitness function.

41. The system of claim 34, wherein the first confidence threshold is between 90 percent and 100 percent.

42. The system of claim 34, wherein the second confidence threshold is between 70 percent and 1100 percent.

43. The system of claim 34, further comprising a field selection module that merges the flagged first business record and second business record into an authoritative business record.

44. The system of claim 43, wherein merging the first business record and the second business record comprises:
- determining a reliability of a first data source for each field in the first business record;
- determining a reliability of a second data source for each field in the second business record; and
- selecting fields from the business record associated with the data source having a higher reliability for that field.

* * * * *

UNITED STATES PATENT AND TRADEMARK OFFICE
CERTIFICATE OF CORRECTION

PATENT NO. : 8,583,571 B2  
APPLICATION NO. : 12/512821  
DATED : November 12, 2013  
INVENTOR(S) : Darren Spehr et al.

Page 1 of 1

It is certified that error appears in the above-identified patent and that said Letters Patent is hereby corrected as shown below:

In the Specification

In column 13, line 40, after "accurate" insert -- . --.

In the Claims

In column 17, line 40, in claim 29, delete "1100" and insert -- 100 --, therefor.

In column 17, line 43, in claim 30, delete "1100" and insert -- 100 --, therefor.

In column 18, line 67, in claim 42, delete "1100" and insert -- 100 --, therefor.

Signed and Sealed this  
Fourth Day of March, 2014

Michelle K. Lee  
*Deputy Director of the United States Patent and Trademark Office*